(12) United States Patent
Moberg et al.

(10) Patent No.: US 6,698,015 B1
(45) Date of Patent: *Feb. 24, 2004

(54) APPARATUS AND METHOD FOR IMPROVING PERFORMANCE OF CRITICAL CODE EXECUTION

(75) Inventors: Kenneth Moberg, Boulder Creek, CA (US); Arthur B. Stine, Sunnyvale, CA (US); Ronnie Bernard Kon, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 502 days.

This patent is subject to a terminal disclaimer.

(21) Appl. No.: 09/594,179

(22) Filed: Jun. 13, 2000

(51) Int. Cl.[7] .............................. G06F 9/45; G06F 9/44
(52) U.S. Cl. ..................... 717/154; 717/141; 717/166
(58) Field of Search .................. 717/140–143, 717/151–152, 154, 158, 162–164, 166–167; 709/212–219, 227, 237–238, 249

(56) References Cited

U.S. PATENT DOCUMENTS

| 5,243,596 | A | * | 9/1993 | Port et al. ................... 370/231 |
| 5,493,667 | A | * | 2/1996 | Huck et al. .................. 711/125 |
| 5,787,470 | A |   | 7/1998 | DeSimone et al. .......... 711/124 |
| 6,064,406 | A | * | 5/2000 | Atkinson et al. ............ 713/100 |
| 6,158,049 | A | * | 12/2000 | Goodwin et al. ............ 717/158 |
| 6,223,256 | B1 | * | 4/2001 | Gaither ....................... 711/134 |
| 6,289,506 | B1 | * | 9/2001 | Kwong et al. ............... 717/148 |
| 6,298,370 | B1 | * | 10/2001 | Tang et al. .................. 709/102 |
| 6,421,703 | B1 | * | 7/2002 | Steinmetz et al. ........... 709/102 |
| 6,453,404 | B1 | * | 9/2002 | Bereznyi et al. ............. 711/171 |

* cited by examiner

Primary Examiner—Antony Nguyen-Ba
(74) Attorney, Agent, or Firm—Thelen Reid & Priest, LLP; David B. Ritchie

(57) ABSTRACT

Critical code routines are identified, separated from other routines, and compiled into a set of one or more critical dynamic link libraries ("DLLs"). These are then recognized by a DLL loader and loaded at a reserved address space in the DLL memory space. Once all of the critical DLLs have been loaded, cache locking may be enabled for the reserved address space. Robust fault containment is facilitated through the use of code modules implemented as shared libraries that can be loaded and unloaded in a running system by individual processes. These code modules can be replaced individually as defects are found and fixed without requiring replacement of the entire system image or application image. What would normally be a monolithic application is modularized, and the sharing of common code among multiple applications is facilitated.

28 Claims, 13 Drawing Sheets

310

Application

_min_dllsym = dlsym(handle, "min");

In dlsym():

1) Validate handle: handle defines location of symbol table
   2) Look up symbol name in hashed symbol table
   3) Return symbol value or NULL if not found

FIG. 4

APPARATUS AND METHOD FOR IMPROVING PERFORMANCE OF CRITICAL CODE EXECUTION

CROSS REFERENCE TO RELATED APPLICATIONS

This application is related to U.S. patent application Ser. No. 09/593,735, filed on an even day herewith and having the title "Performance Improvement Of Critical Code Execution."

BACKGROUND OF THE INVENTION

1. Field of the Invention

The present invention relates to the field of data communications networks. More particularly, the present invention relates to performance improvement of critical code execution using shared libraries and/or cache locking techniques.

2. Background

FIG. 1 is a block diagram illustrating a network connection between a user 10 and a particular web page 20. FIG. 1 is an example which may be consistent with any type of network known to those skilled in the art, including a Local Area Network ("LAN"), a wide area network ("WAN"), or a combination of networks, such as the Internet.

When a user 10 connects to a particular destination, such as a requested web page 20, the connection from the user 10 to the web page 20 is typically routed through several routers 12A–12D. Routers are internetworking devices. They are typically used to connect similar and heterogeneous network segments into Internetworks. For example, two, LANs may be connected across a dial-up, integrated services digital network ("ISDN"), or across a leased line via routers. Routers may also be found throughout the Internet. End users may connect to a local Internet service provider ("ISP") (not shown).

FIG. 2 is a block diagram of a sample router 12 suitable for implementing an embodiment of the present invention. The router 12 is shown to include a master control processing unit ("CPU") 210, low and medium speed interfaces 220, and high speed interfaces 230. The CPU 210 may be responsible for performing such router tasks as routing table computations and network management. It may include one or more microprocessor integrated circuits selected from complex instruction set computer ("CISC") integrated circuits (such as the Motorola 68040 Microprocessor), reduced instruction set computer ("RISC") integrated circuits (such as the RM4000 or RM7000 RISC processors available from Quantum Effect Design, Inc. of Santa Clara, Calif.), or other available processor integrated circuits. Non-volatile RAM and/or ROM may also form a part of CPU 210. Those of ordinary skill in the art, having the benefit of this disclosure, will recognize that there are many alternative ways in which memory can be coupled to the system.

The interfaces 220 and 230 are typically provided as interface cards. Generally, they control the transmission and reception of data packets over the network, and sometimes support other peripherals used with the router 12. Examples of interfaces that may be included in the low and medium speed interfaces 220 are a multiport communications interface 240, a serial communications interface 250, and a token ring interface 260. Examples of interfaces that may be included in the high speed interfaces 230 include a fiber distributed data interface ("FDDI") 270 and a multiport Ethernet interface 280. Each of these interfaces (low/medium and high speed) may include (1) a plurality of ports appropriate for communication with the appropriate media, and (2) an independent processor such as the 2901 bit slice processor (available from Advanced Micro Devices Corporation of Santa Clara, Calif.) or the RM-7000 RISC processor (available from Quantum Effect Design, Inc. of Santa Clara, Calif.), and in some instances (3) volatile RAM. The independent processors control such communication intensive tasks as packet switching and filtering, and media control and management. By providing separate processors for the communication intensive tasks, this architecture permits the master CPU 210 to efficiently perform routing computations, network diagnostics, security functions, and other similar functions.

The low and medium speed interfaces are shown to be coupled to the master CPU 210 through a data, control, and address bus 290. High speed interfaces 230 are shown to be connected to the bus 290 through a fast data, control, and address bus 292 which is in turn connected to a bus controller 294. The bus controller functions are provided by a processor such as the 2901 bit slice processor or the RM-7000 RISC processor.

Although the system shown in FIG. 2 is an example of a router suitable for implementing an embodiment of the present invention, it is by no means the only router architecture on which the present invention can be implemented. For example, an architecture having a single processor that handles communications as well as routing computations, etc. would also be acceptable. Further, other types of interfaces and media could also be used with the router. Moreover, the present invention is not limited to router applications, but may be used in any performance-sensitive application where the execution speed of critical code must be maximized.

In the past, it has not been possible to affect the cache locality of critical code, such as data forwarding or packet switching code in routers. Minor changes made to the code could affect the memory footprint, and hence the caching of critical software forwarding routines. As described herein, newer processors with cache locking functionality offer the ability to lock certain performance-critical routines in cache memory. However, in order to take advantage of cache locking features, a method is needed to guarantee cache locality of critical code.

Thus, the present invention provides consistently faster performance for critical code across software changes and version releases by guaranteeing the cache locality of critical code and by utilizing the cache-locking features of a processor providing such functionality when available. Techniques according to embodiments of the present invention improve the probability that critical code will be cached, and thus offer a significant performance improvement over known techniques. These and other features and advantages of the present invention will be presented in more detail in the following specification of the invention and in the associated figures.

SUMMARY OF THE INVENTION

Critical code routines are identified, separated from other routines, and compiled into a set of one or more critical dynamic link libraries ("DLLs"). These are then recognized by a DLL loader and loaded at a reserved address space in the DLL memory space. Once all of the critical DLLs have been loaded, cache locking may be enabled for the reserved address space. Robust fault containment is facilitated through the use of code modules implemented as shared libraries that can be loaded and unloaded in a running system by individual processes. These code modules can be replaced individually as defects are found and fixed without requiring replacement of the entire system image or application image. What would normally be a monolithic application is modularized, and the sharing of common code among multiple applications is facilitated.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings:

FIG. 4 is a block diagram illustrating the process of resolving a symbol according to aspects of the present invention.

DETAILED DESCRIPTION

Figure 1:
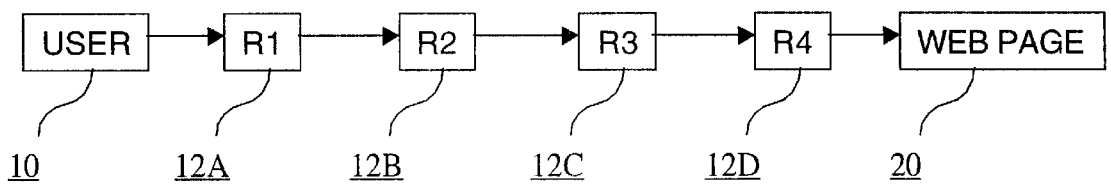
FIG. 1 is a block diagram of an example of a network connection between a user and a web page.
Figure 2:
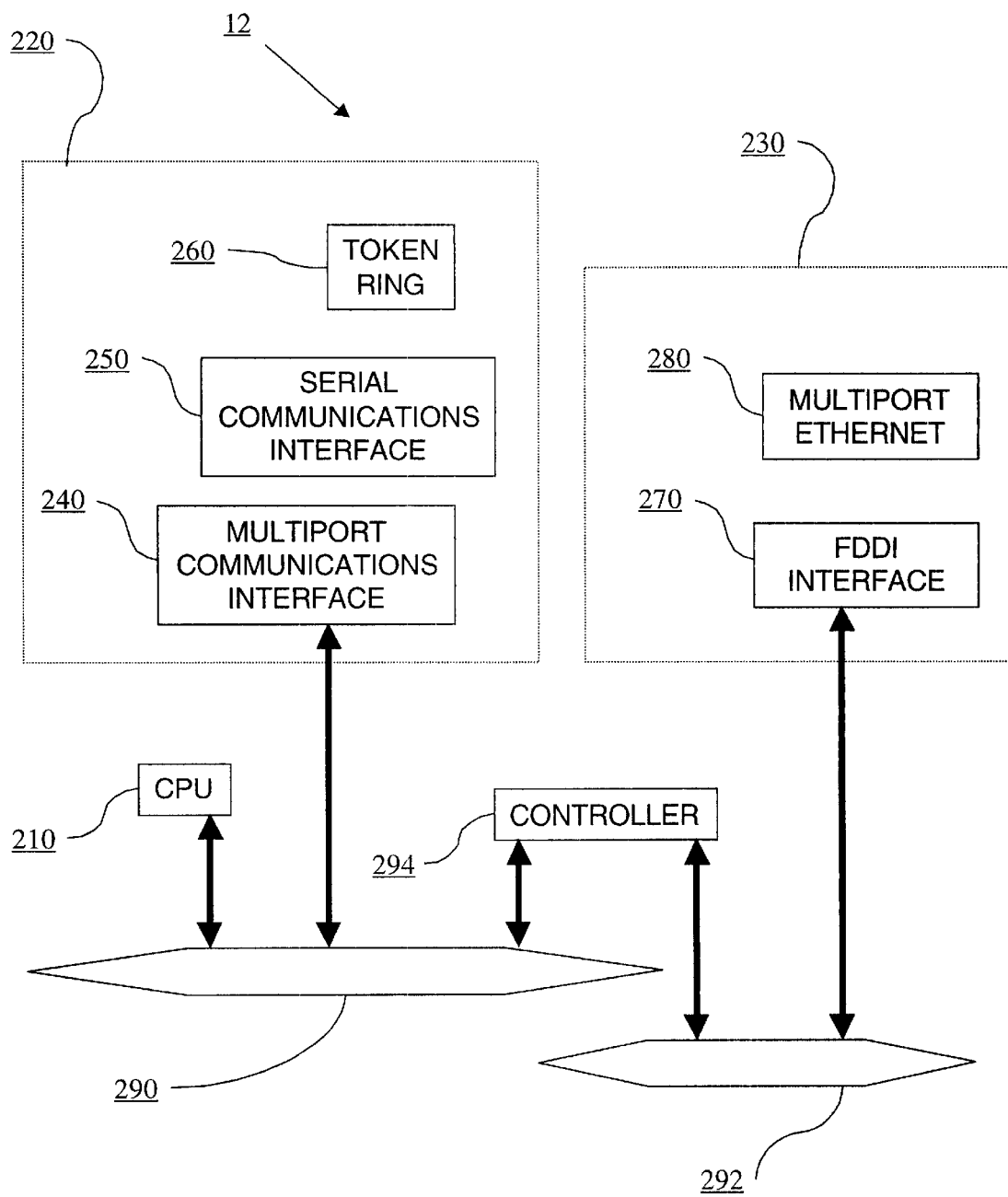
FIG. 2 is a block diagram of a sample router suitable for implementing an embodiment of the present invention.

Those of ordinary skill in the art, having the benefit of this disclosure, will realize that the following description of the present invention is illustrative only and not in any way limiting. Other embodiments of the invention will readily suggest themselves to such skilled persons after a perusal of the within disclosure.

In the interest of clarity, not all the routine features of the implementations are described. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill having the benefit of this disclosure.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

One of the design goals of complex software applications is to provide fault containment through the use of code modules that can be loaded and unloaded in a running system by individual processes. These code modules can be replaced individually as defects are found and fixed without replacement of the entire system image or applications. This design goal can be satisfied through the use of shared libraries. Shared libraries allow what would normally be a monolithic application to be modularized and to allow the sharing of common code among multiple applications.

It should be noted that the terms "shared library" and "dynamic link library" are used interchangeably in this document. A Dynamic Link Library ("DLL") represents a very powerful and efficient way for applications to share code and data. A DLL is an executable library module containing functions or resources for use by applications or other DLLs. Unlike typical programs however, DLLs do not have a single entry point. Instead, like libraries, DLLs can have multiple entry points, one for each exported subroutine ("Sub") or function ("Function"). It should also be noted that the term "API" in this document means "Application Programming Interface."

Static linking is known to those skilled in the art as the process of writing one or more modules, and then linking them to create a complete, stand-alone executable program. When a program uses a Sub or Function from a library, a copy of that Sub or Function's code is added to the program's executable file. If two programs are running simultaneously and use the same Sub or Function, there will be two copies of that routine present in memory. It would be more efficient if the two programs could share a single copy of the routine, and DLLs provide that ability.

In contrast to static linking, dynamic linking using DLLs provides a mechanism to link applications to libraries at run-time. Unlike a static library, the code in a DLL is not included into the program that uses the DLL. Instead, a DLL's code and resources are in a separate file (usually with a .DLL extension). This file must be either currently loaded in memory, or accessible to the operating system when the program that uses the DLL executes. To access the individual procedures in a DLL, a DECLARE statement is typically included in the program code with the name of the Sub or Function and the name of the DLL.

Unlike conventional libraries, when a DLL is loaded into memory by the operating system, its procedures are accessible by all other programs (or DLLs). Only one copy of the DLL needs to be present in memory. This is possible because the library is not linked into any one of the programs permanently. It is simply present, in memory, making its services available to any code that may need them.

Before a function or procedure in a DLL can be used, the DLL must first be loaded into memory. Loading DLLs at runtime can be accomplished in two ways: static loading and dynamic loading.

"Static loading" means that a DLL is automatically loaded when the application that calls the DLL is loaded. To use static loading, a function or procedure that resides in the DLL is typically declared with the "external" keyword. The DLL is automatically loaded when the application loads, and any functions or procedures exported from the DLL can then be called just as any other function or procedure would be called. This is by far the easiest way to use code contained in a DLL. The disadvantage to this approach is that if a DLL that the program references is missing, the program will refuse to load.

In contrast, with "dynamic loading," a DLL is only loaded into memory when needed and unloaded from memory when it is no longer needed. One advantage of dynamic DLL loading is that the DLL is in memory only as long as it is needed, resulting in more efficient use of memory. Another advantage is that applications will typically load more quickly when using dynamic loading because not all the code needed to run the program is loaded when the application initially loads.

Shared libraries traditionally use position-independent code ("PIC") (also known as "PC relative addressing") to provide ease of mapping from one process address space to another. The use of PIC allows the code and data in the shared library to be located anywhere within the address space of a given process rather than requiring fixed addresses to be used for each shared library in every process of the system. However, PIC is relatively slower to execute on most processor architectures, due to the additional calculations that must be done during execution to compute the addresses of code and data relative to the program counter ("PC").

As an alternative, absolute addressing ("non-PIC") may be used in the shared libraries. Non-PIC shared libraries provide better performance than PIC shared libraries, but restrict implementation flexibility by requiring that the code and data be located at fixed addresses in the virtual memory space of every process in the system in order to function correctly. This constraint requires the use of a reserved memory region in the virtual address space, so that each process can be guaranteed to not allocate addresses in a shared library region for purposes other than accessing a particular shared library. This constraint also requires additional processing when loading a shared library into memory, as the shared library loader needs to perform address relocations on every explicit address reference. This additional processing will impact the load time for the first process which requests access to a shared library. However, since the additional processing need only be performed once, at the time of loading, subsequent access requests do not incur any load time performance penalty. To optimize performance, one embodiment of the present invention implements non-PIC DLL style shared libraries. However, PIC DLL style shared libraries can also be implemented by those skilled in the art without departing from the scope of the present invention.

Functional Description

The following tables (Tables 1 through 6) identify and describe the software modules used in one embodiment of the present invention. In this embodiment, there are two principal functional components of the present invention: the application program which is to be optimized, and a DLL Manager. Table 1 identifies and describes the DLL Manager source components that are platform independent (i.e., that are not a function of the specific processor used to implement the present invention).

TABLE 1

DLL Manager source components

| | |
|---|---|
| dllmgr.h | Private header. Defines the location and size of the reserved memory region for DLLs, prototepes for DLL Manager functions, and private data types. |
| dllmgr_cache.c | Functions to manipulate the DLL handle cache. |
| dllmgr_funcs.c | Platform-independent message handling functions (e.g., _DLL_OPEN,_DLL_CLOSE). |
| dllmgr_init.c | Functions to initialize the DLL Manager. |
| dllmgr_io.c | Functions to handle input/output function messages sent to the DLL Manager. |
| dllmgr_search.c | Functions to perform file system searches/ "lookups" for shared libraries. |
| main.c | Main program for the DLL Manager. |
| include/sys/dll_msg.h | Public header containing definitions of dllmgr messages and structures. |

Table 2 identifies and describes the DLL Manager source components that are platform-dependent (i.e., that are a function of the specific processor used to implement the present invention). Two exemplary embodiments are included in the table: (1) MIPS (or Quantum Effect Design) platforms, and (2) Intel x86 platforms. Those of ordinary skill in the art, having the benefit of this disclosure, will realize that these examples are not in any way limiting, and that other processors with similar functionality fall within the scope of the present invention.

TABLE 2

DLL Manager platform-dependent source components

| | |
|---|---|
| mips/dllmgr_mips.c | Functions to perform loading, relocation, and unloading of DLLs for MIPS platforms. |
| x86/dllmgr_x86.c | Functions to perform loading, relocation, and unloading of DLLs for x86 platforms. |

Table 3 identifies and describes the DLL source components that are used in one embodiment of the present invention to implement the DLL administration functions.

TABLE 3

Dynamic-linking library source components

| | |
|---|---|
| dl_priv.h | Header defining private function prototypes and constants used internally |
| dladdr.c | Implementation of dladdr() |
| dlclose.c | Implementation of dlclose() |
| dlerror.c | Implementation of dlerror() |
| dlopen.c | Implementation of dlopen() |
| dlsym.c | Implementation of dlsym() |
| dlutil.c | Private utility functions used within libdl.a |
| include/dlfcn.h | Public header defining dynamic-linking library API and data structure definitions |

According to aspects of the present invention, a library is needed to resolve C library functions used within the static dynamic-linking library, libdl.a. Table 4 identifies and describes the minimal static C library source components.

TABLE 4

Minimal static C library source components

| | |
|---|---|
| _CMain.c | Secondary application startup routine, called by _start. This module has been modified to load the DLL for libc and set up various global data before calling the application's main(). |

TABLE 4-continued

Minimal static C library source components

| | |
|---|---|
| exit.c | Application termination function. This module has been modified to unload the libc DLL before terminating the application. |
| init-globals.c | Initialize critical libc globals |

Table 5 identifies and describes the build host binary components used in one embodiment of the present invention.

TABLE 5

Build host binary components

| | |
|---|---|
| libdl.a | This is the dynamic-linking (dl) static library. Each application which needs to reference shared libraries during its run-time must link with this library in addition to any other libraries it may link with. |
| libcmin.a | This library contains the minimal static libc functions that are used in conjunction with the dynamic-linking library for applications. It implements only the bare essentials of libc that are required for the dynamic-linking library to load the C library DLL (libc.dll). |
| libc.dll.a | This is the stub library used to link with the dynamically linked C library (libc.dll). An application using the libc DLL will link with this library in addition to the libdl.a and libcmin.a static libraries and any other application specific libraries. |
| mkstubs | This utility is used to generate stubs for Callng DLL functions and accessing data components in DLLs. |

Table 6 identifies and describes the target platform components used in one embodiment of the present invention. The target platform may contain additional application-specific shared libraries.

TABLE 6

Target platform components

| | |
|---|---|
| dllmgr | The module is the DLL Manager (also known as the "DLL Loader"). The DLL Manager handles all loading and unloading of DLLs in one embodiment of the present invention. |
| dlladmin | This is the DLL Manager Administration Utility. It communicates with the DLL Manager to change the run-time behavior of the DLL Manager, retrieve status of DLLs currently loaded in the system, and may be used to verify or validate a DLL before it is loaded into the running system. |
| libc.dll | This is the shared C library. It is loaded on behalf of applications by the DLL Manager (dllmgr). |

System Flow

From an application's point of view, there are three primary activities that are performed with shared libraries:

1. Loading
2. Symbol resolution (i.e., "lookup")
3. Unloading

Figure 3:
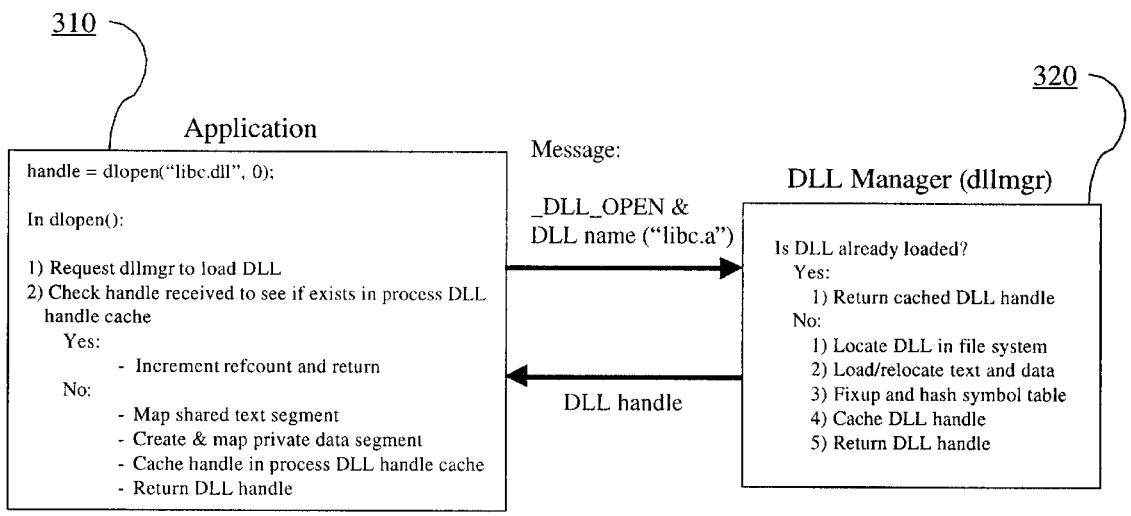
FIG. 3 is a block diagram illustrating the process of loading a dynamic linked library according to aspects of the present invention.

FIG. 3 is a block diagram illustrating the process of loading a dynamic linked library according to aspects of the present invention. Referring now to FIG. 3, the application 310 is requesting to load a DLL, in this case libc.dll, into the process's address space. Since the libc DLL is always loaded before the application's main( ) function is called, any subsequent calls to libc functions should never result in the 'long path' being performed within the DLL Manager 320 to access a libc function. In one embodiment of the present invention, the DLL Manager will only be contacted on the first function reference, and subsequent calls will only call dlsym( ) to resolve a function value.

To resolve symbols, the application uses the dynamic-linking library API dlsym( ). Given a handle and the character string representation of the desired symbol, dlsym( ) will attempt to locate the symbol in the hashed symbol table of the shared library. If the symbol is found, the value of the symbol is returned; otherwise, NULL is returned. As shown in FIG. 4, symbol resolution does not require message traffic with the DLL Manager, because the handle specifies the location of the symbol table.

Figure 5:
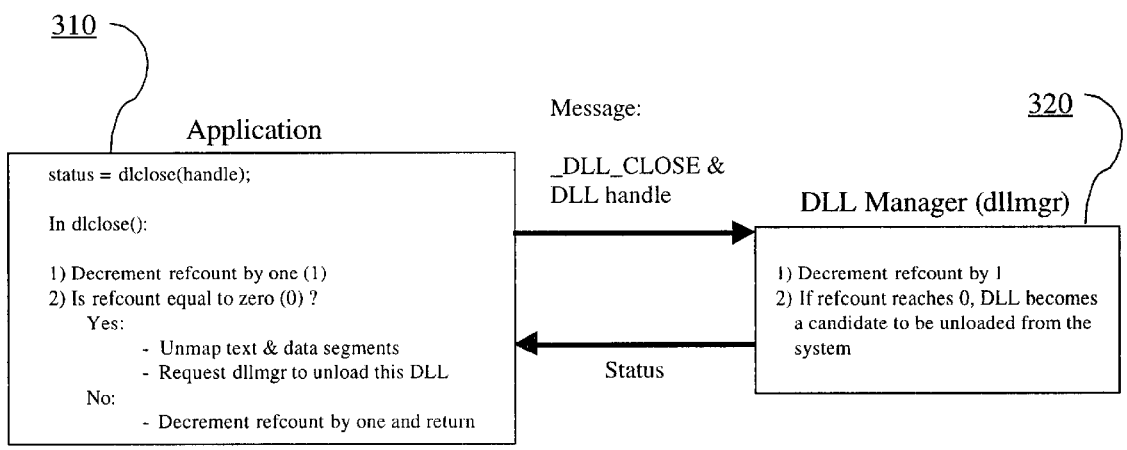
FIG. 5 is a block diagram illustrating the process of unloading a dynamic linked library according to aspects of the present invention.

When no longer needed by an application, a shared library may be unloaded (i.e., closed). If the application has multiple references to the shared library (in other words, has performed more than one dlopen( ) for a given shared library), it will need to perform an equal number of dlclose( ) calls in order to close the shared library. Each dlclose( ) call will decrement the reference count by one. When the application's reference count to the shared library reaches zero, the shared library may be removed from the application's address space. The application must not make any references to either code or data in the shared library after this point, as it will result in an invalid address reference (i.e., the process will be signaled with appropriate operating system error signals such as SIGBUS or SIGSEGV). FIG. 5 is a block diagram illustrating the process of unloading a dynamic linked library according to aspects of the present invention.

Interface Design

Rather than introduce a new API for accessing shared libraries, embodiments of the present invention use the UNIX98-defined APIs known to those of ordinary skill in the art. Those of ordinary skill in the art will also recognize that the use of UNIX98-defined APIs is exemplary only, and not in any way limiting. In embodiments of the present invention, shared libraries are accessed by application programs through the following APIs in the dynamic-linking library (libdl.a):

libdl/dlopen.c:

void *dlopen (const char *name, int flag);

This function makes the shared library specified by name available to the calling application, and returns to the caller a handle which the process may use on subsequent calls to dlsym( ) and dlclose( ). The value of this handle should not be interpreted in any way by the caller. If the shared library cannot be located in the system or cannot be loaded for any reason, dlopen( ) returns NULL. The actual reason for the failure can be determined by calling dlerror( ). The flag parameter is currently reserved for future use and should be specified as zero (0). If the same DLL is loaded more than once with dlopen( ), the same shared library handle is returned. The dynamic-linking library maintains reference counts for shared library handles, so the shared library is not unloaded from the process address space until dlclose( ) has been called as many times as dlopen( ) has been successfully called for the shared library. If the shared library implements a function with the name dllmain( ), it will be called with the flag DLL_PROCESS_ATTACH after the shared library is loaded.

libdl/dlsym.c:

void *dlsym (void *handle, const char *name);

This function returns the value of the global symbol name defined within the shared library specified by handle or NULL if the symbol is not found in the shared library's symbol table.

libdl/dlclose.c:

int dlclose (void *handle);

The dlclose( ) function is used to inform the system that the object referenced by the handle returned from a previous dlopen( ) invocation is no longer needed by the application. The reference count of the shared library handle is decremented, and the memory mapped into the caller's address space will be unmapped when the reference count for the shared library reaches zero. If the shared library implements the function dllmain( ), it will be called with the flag DLL_PROCESS_DETACH before the shared library is unmapped from the process.

The use of dlclose( ) reflects a statement of intent on the part of the process but does not create any requirement upon the implementation, such as removal of the code or symbols referenced by handle. Once an object has been closed using dlclose( ), an application should assume that its symbols are no longer available to dlsym( ). All objects loaded automatically as a result of invoking dlopen( ) on the referenced object are also closed.

Although a dlclose( ) operation is not required to remove structures from an address space, neither is an implementation of the present invention prohibited from doing so. The only restriction on such a removal is that no object will be removed to which references have been relocated, until or unless all such references are removed.

libdl/dlerror.c:

const char *dlerror (void);

The dlerror( ) function returns a null-terminated character string (with no trailing newline) that describes the last error that occurred during dynamic linking processing. If no dynamic linking errors have occurred since the last invocation of dlerror( ), dlerror( ) returns NULL. Thus, invoking dlerror( ) a second time, immediately following a prior invocation, will result in NULL being returned.

It should be noted that in one embodiment of the present invention, the messages returned by dlerror( ) may reside in a static buffer that is overwritten on each call to dlerror( ). Application code should not write to this buffer. Programs wishing to preserve an error message should make their own copies of that message. Depending on the application environment with respect to asynchronous execution events, such as signals or other asynchronous computation sharing the address space (i.e., threads), portable applications should use a critical section to retrieve the error pointer and buffer.

End User Interface

As disclosed more fully in the following sections, the end user interface in one embodiment of the present invention comprises a DLL Manager (dllmgr), a DLL Configuration Utility (dlladmin), and a Stub Creation Utility (mkstubs).

DLL Manager (dllmgr)

According to embodiments of the present invention, the DLL Manager ("dllmgr") is the system resource manager that handles all load and unload requests from applications wishing to access shared libraries. In one embodiment, the usage syntax and options for the DLL Manager are as follows:

| Usage: | dllmgr [options] & |
|---|---|
| Options: | |
| -d mask | This option specifies the debug level. Used to direct dllmgr to emit information during operation. Debug masks are defined in dlfcn.h |
| -v | This option specifies verbose mode. In this mode, dllmgr will print various ongoing status messages to the system console. |
| -u seconds | Specifies the numbers of seconds before an unreferenced DLL will be considered for removal from memory. |
| -r seconds | Specifies the delay time between scans for unreferenced DLLs. |

| Usage: | dllmgr [options] & |
|---|---|
| Options: | |
| -p | Directs the dllmgr to use private TLB mappings when loading DLLs rather than placing the text segment into a global TLB mapping. |

DLL Configuration Utility (dlladmin)

In one embodiment of the present invention, the DLL Configuration Utility (dlladmin) is used to manage the use of DLLs. The dlladmin utility may be added to the system either by placing it into the flash file system ("FFS") used in an embodiment of the present invention, or by building it into the system boot image by way of the build file used by the standard mkxfs utility. In one embodiment, the usage syntax and options for the DLL Configuration Utility are as follows:

| Usage: | dlladmin [options] |
|---|---|
| Options: | |
| -v | Verbose mode. Emits additional information during command processing. |
| -i DLL/all | Report information about the specified DLL. The reserved keyword all specifies that information about all loaded DLLs will be reported. |
| -l DLL | Load specified DLL into memory. |
| -u DLL | Unload specified DLL. If the specified DLL is not referenced by any running application, it will be unloaded immediately. Otherwise, the request to unload will be queued and the actual unloading of the DLL will happen when the last application releases its reference to the DLL (via dlclose()). |
| -w DLL | "Wire" the specified DLL in memory (forces DLL to stay resident even when there are no more references). |
| -c chksum DLL | Validate DLL against specified checksum. | mkstubs

The mkstubs utility is used during the shared library generation process to create the stubs and/or static stub library for applications to link with to use a shared library in one embodiment of the present invention. The mkstubs utility is normally not invoked manually. In one embodiment, the usage syntax and options for the mkstubs utility are as follows:

| Usage: | mkstubs [options] outputlibrary g0library [g0libs] |
|---|---|
| Options: | |
| -a arch | Architecture to be used |
| -D directory | Directory to place generated stubs |
| -d libname.dll | DLL library the stubs are to reference |
| -h | Print the usage message |
| -k | Keep generated source files (default when -S is specified) |
| -p prefix | Specifies prefix for generated source file names |
| -S | Generate stub source files only (don't compile/build library) |
| -s suffix | Suffix for generated source file names |
| -v | Be verbose and print status/info messages during stub generation |
| outputlibrary | Specifies library where generated .o files should be placed |
| g0library | Specifies library used as the source for collecting symbol names to be used as stubs |
| [g0libs] | Additional libraries or .o files to be scanned for stub symbols |

Every stub function references a single function to invoke dlopen( ) to load the shared library and dlsym( ) to resolve the function symbol. In embodiments of the present invention, the function naming format is __<library-name>__dllload. For example, for libtest1.dll, the function is named __libtest1__dllload. A utility program generates this function when it generates the stub functions for a given library. The following is a commented example of the loading and resolving function for libtest1.dll in an embodiment of the present invention based on a MIPS/QED platform.

```
#    /* This file was automatically generated by /router/bin/mkstubs */
#    #include <dlfcn.h>
#    dll_t *__libtest1__dllhandle = NULL;
#    void *
#    __libtest1__dllload (char *sym, void **addr)
#    {
#        if ( __libtest1__dllhandle == NULL)
#            __libtest1__dllhandle = dlopen(\"libtest1.dll\", 0);
#        if ( __libtest1__dllhandle != NULL)
#            *addr = dlsym(__libtest1__dllhandle, sym);
#        return (*addr);
#    }
     .globl   __libtest1__dllhandle
     .data
     .align 2
__libtest1__dllhandle:
     .word 0
     .rdata
     .align 2
__libtest1__libname:
     .ascii "libtest1.dll\000"
     .text
     .set noreorder
     .align 2
     .globl __libtest1__dllload
     .ent __libtest1__dllload
__libtest1__dllload:
     .frame   $sp,44,$31              #  vars= 0, regs= 4/0, args= 16,
     extra=   0
     .mask    0x800300f0,-8           #  mask for ra,s1,s0,a3,a2,a1,a0
     .fmask   0x00000000,0
     lw       $2,__libtest1__dllhandle
     subu     $sp,$sp,44              #  adjust the stack
     sw       $4,16($sp)              #  save the first arg
     sw       $5,20($sp)              #  save the second arg
     sw       $6,24($sp)              #  save the third arg
     sw       $7,28($sp)              #  save the fourth arg
     sw       $31,32($sp)             #  save the return address
     sw       $16,36($sp)             #  save original s0
     sw       $17,40($sp)             #  save original s1
     move     $16,$8                  #  save the sym arg
     bne      $2,$0,__libtest1__loaded #  if dllhandle != NULL
     move     $17,$9                  #  save the addr arg (delay slot)
     la       $4,__libtest1__libname  #  a0 <- library name
     jal      dlopen                  #  handle = dlopen(library, 0)
     move     $5,$0                   #  a1 <- 0 (branch delay slot)
     sw       $2,__libtest1__dllhandle
     beq      $2,$0,__libtest1__havesym  #  if handle == 0
     nop                              #  branch delay slot
     .end     __libtest1__dllload
     lw       $7,28($sp)              #  save the fourth arg
     lw       $16,36($sp)             #  restore s0
     lw       $17,40($sp)             #  restore s1
     lw       $31,32($sp)             #  restore ra
     j        $2                      #  make the call (or call NULL)
     addu     $sp,$sp,44              #  fix the stack
     .end     __libtest1__havesym
     .set     reorder
```

Note that after symbol resolution in the above example, there is an unconditional call to the address returned, even it is NULL (i.e., the symbol wasn't found in the symbol table). The is no other 'correct' action to take in the generic case. If it is critical for the application to recover from an unresolved symbol at run-time, this part of the loader/resolver function should be modified to return some result that makes sense for the functions in each particular library.

According to embodiments of the present invention, the DLL handles are dynamically allocated in each application and DLL as part of linking against the dynamic-linking library (libdl.a). There is a single static handle that is reserved for libc. There is no fixed limit on the number of DLLs an application and its associated DLLs may load. The number of DLLs is limited only by the available memory on the system.

It is possible to load multiple versions of the same shared library within a single application. However, this obviates the use of the default stub functions, as by default, stubs are generated for a specific version of a shared library. The expected use of multiple versions of shared libraries concurrently is for DLLs implementing driver-like functionality, where the functions within the DLL are accessed through a function table rather than stubs. In order to use stubs with multiple versions of a DLL, those skilled in the art will realize that it is necessary to modify the manner in which the shared library name is defined and also to modify how the function values are stored once resolved, as they will need to be reinitialized when loading the new version of the library.

Figure 6:
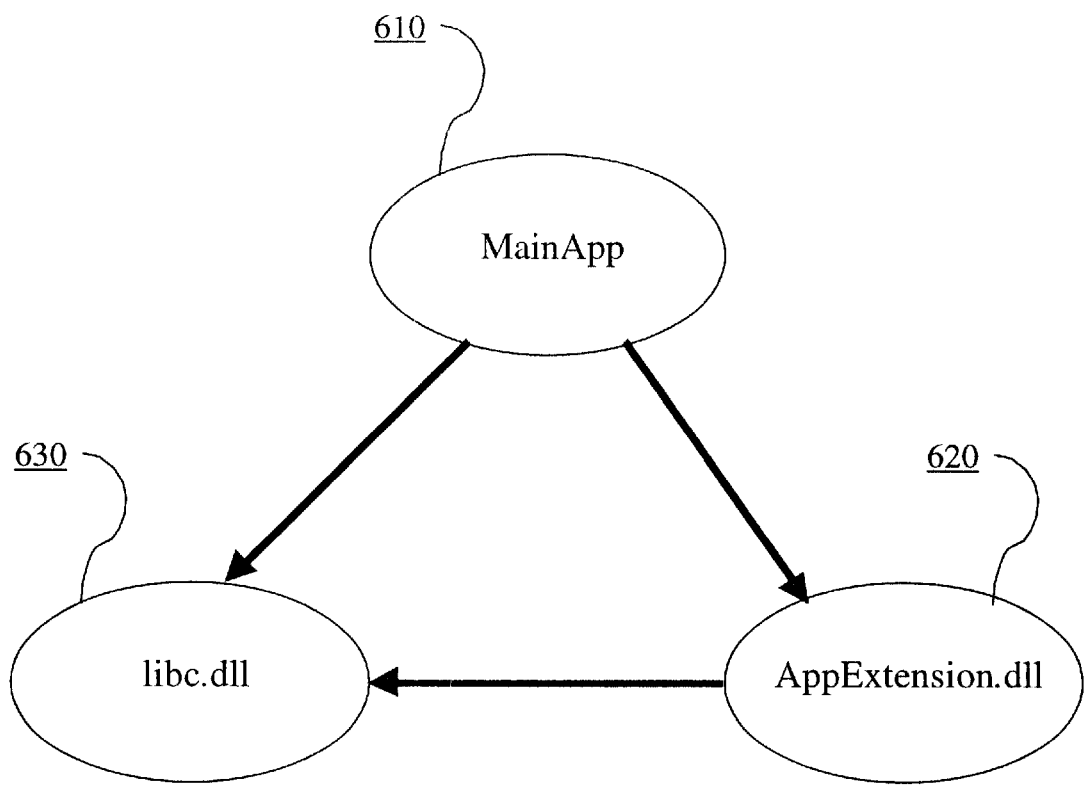
FIG. 6 is a block diagram illustrating the use of nested shared libraries according to an aspect of the present invention.

In some embodiments of the present invention, it will commonly be the case that both application code and a DLL that the application has loaded will both need to access another common DLL, as shown in FIG. 6. In the diagram shown in FIG. 6, MainApp 610 and AppExtension.dll 620 both want to load and reference libc.dll 630. This situation is handled automatically by the dynamic linking library code, and is transparent to application writers. Each additional reference merely increments a reference counter for the library handle. References to shared libraries are decremented upon a call to dlclose( ), and all references are cleaned up when the application exits.

Linking Applications that Use Shared Libraries

In one embodiment of the present invention, linking an application that uses shared libraries is performed in two stages. In the first stage (as shown in the example below), all application object files and the dynamic linking library (in its entirety) are partially linked:

```
gcc.96ql.mips64 -r -u -start -u main -EB -G 4 -u__start -e__start -
nostdlib -o/ /aaf/user/dllmgr/test/testdll/mips/dlllinked/testdll.tmp -g
testdll.o -L. -L/aaf/user/support/mipsbe/lib -L/aaf/user/usr/mipsbe/lib
-Wl,--whole--archive -ldl
```

The second stage links in the result of the first stage with the minimal C library, various stub libraries that the application references, including libc.dll.a:

```
gcc.96ql.mips64 -nostdlib -T/aaf/user/usr/mipsbe/etc/ link.map -Ttext
0x8020000 /user/usr/mipsbe/lib/ crtl.o -mips2 --no-keep-memory -
o/aaf/user/dllmgr/ test/testdll/mips/dlllinked/testdll
/user/dllmgr/test/testdll/mips/dlllinked/testdll.tmp -g -L. -
L/aaf/user/support/mipsbe/lib -L/aaf/user/usr/mipsbe/lib -lcmin -
ltest1.dll -ltest2.dll -EB -lc.dll -lsoftfp -lgcc__math
```

The output of the second stage results in a fully resolved and linked executable file.

Creating Shared Libraries

According to an embodiment of the present invention, code that is to become part of a shared library must be compiled with the "−G 0" option to insure that no General Purpose ("GP") register relative addressing is generated. Code that is not going to be placed in a shared library (e.g., main application code) may make full use of GP register relative addressing.

In this embodiment, a shared library's run-time components typically include two sub-parts: the .dll file, which contains the actual code and data for the shared library, and the .dll.a file, which contains the stubs that are linked into applications and/or other shared libraries, and which is used to access the actual code in the .dll file.

Linking a shared library involves similar steps as for linking an application, with the addition that the actual shared library itself is not a fully linked executable. It must be left as a partially linked (gld option -r) object file to retain the relocation entries. The symbol file for a shared library however, is a fully linked executable that is based at virtual address 0x0. This is done so that when the symbols are loaded via the gdb add-sym command, the offset address specified is correct. The following examples illustrate the creation of shared libraries on an exemplary MIPS platform according to aspects of the present invention.

```
gcc.96ql.mips64 -r -u -start -u main -EB -G 0 -u__start -e__start -
nostdlib -Wl, -Map -Wl,libtest1.dll.sym.tmp.map -o libtest1.dll.sym.tmp
-T/aaf/user/usr/mipsbe/etc/link. map -Ttext 0x0 ___get__errfoo__ptr.o
dllmain.o func1.o func2.o func3.o unload__test2.o --whole-archive -
L/aaf/user/usr/mipsbe/lib -ldl
gcc.96ql.misp64 -r -u__start -u main -EB -G 0 -u__start -e__start -nostdlib
-Wl,-Map -Wl,libtest1.dll.sym.map -e dllmain -o libtest1.dll.sym -
T/aaf/user/usr/mipsbe/etc/link.map -Ttext 0x0 libtest1.dll.sym.tmp -
L/aaf/user/usr/mipsbe/lib -lcmin -lsoftfp -lgcc__math -lc.dll
gcc.96ql.misp64 -r -u__start -u main -EB -G 0 -u__start -e__start -nostdlib
-Wl, -Map -Wl,libtest1.dll.map.tmp -o /aaf/user/dllmgr/test/
libtest1/mips/dll.be/libtest1.dll.tmp ___get__errfoo-ptr.o dllmain.o
func1.o func2.o func3.o unload__test2.o --whole-archive
/aaf/user/usr/mipsbe/lib/libdl.a
gcc.96ql.misp64 -r -u__start -u main -EB -G 0 -u__start -e__start -nostdlib
-Wl,-Map -Wl.libtest1.dll.map -o
/aaf/user/dllmgr/test/libtest1/mips/dll.be/libtest1.dll
/aaf/user/dllmgr/test/libtest1/mips/dll.be/libtest1.dll.tmp -
L/aaf/user/usr/mipsbe/lib -lcmin -lsoftfp -lgcc__math -lc.dll
```

Memory Allocation

In general, the memory allocation requirement of a shared library is comprised of:

1. Size of code (.text) section
2. Size of symbol table
3. Size of read-only data (.rodata) section(s)
4. Size of initialized data (.data) section(s)
5. Size of uninitialized data (.bss) section(s)

Figure 7:
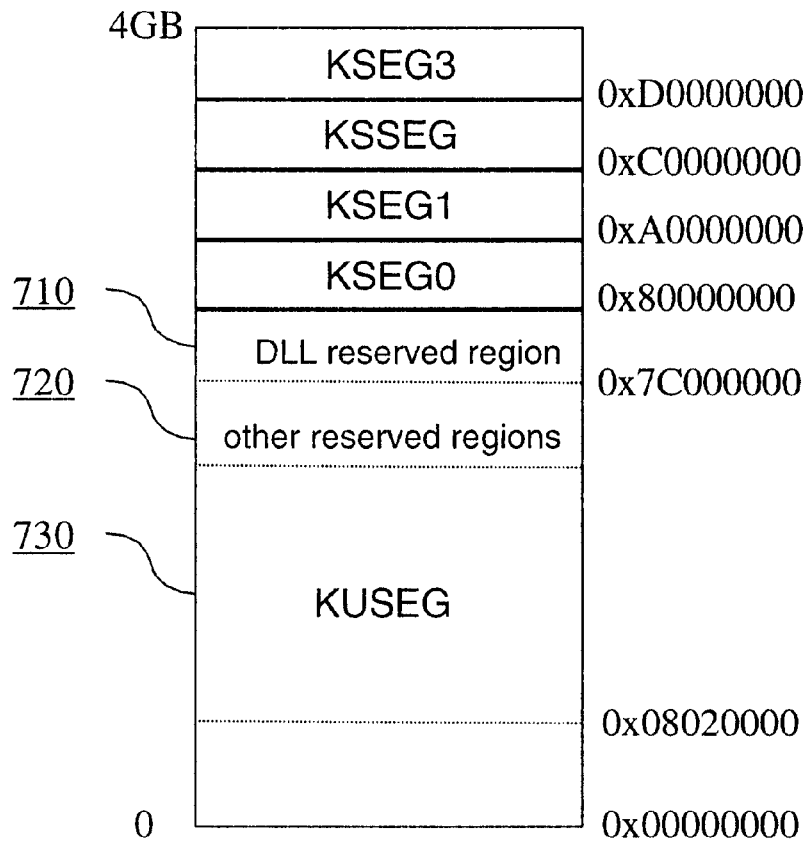
FIG. 7 is a block diagram illustrating an exemplary memory layout on one hardware platform implementation of the present invention.

An exemplary DLL memory layout 700 on a MIPS-based platform is described below and illustrated in FIG. 7. Memory for the code and data sections of shared libraries are allocated from a reserved region in the user virtual address space. For example, on a MIPS/RM 4000 based platform, this region is located just below the MIPS__R4K__K0BASE and extends for 0x4000 4K pages (64 MB) (throughout this document, the conventional "0x" prefix before a number refers to a number expressed using hexadecimal notation). The actual size of the reserved regions will vary depending on the needs of a given platform. In FIG. 7, the DLL reserved region 710 starts at address 0x7C000000 and extends to 0x7FFFFFFF. If so desired for a particular implementation, a separate reserved region 720 can be provided just below address 0x7C000000. Normal user mode (KUSEG) applications 730 have an entry address of 0x80200000 and will grow up from there.

On embodiments of the present invention based on a MIPS/RM 4000 platform, the DLL reserved region 710 is further divided into two sections. The first partition, for code, is set up as a single large page (16 MB) which is globally mapped with a single Translation Lookaside Buffer ("TLB") entry. This allows all processes to share the single TLB entry for access to the text section of the DLL. The second partition, for data, is set up to be mapped with process private TLB entries which are not shared, as the data section of a DLL is allocated separately for each process.

Since the smallest page size on a MIPS/RM 4000-based platform is 4 Kbytes, there is typically bound to be wasted memory space, particularly in the data segment, as many DLLs allocate only a small amount of data. There is some space wasted in the text segments (due to page size rounding), but it is not nearly as pronounced as it is with the data segment To compensate for this, a scheme has been devised according to aspects of the present invention to subdivide the normal 4 Kbytes page into "pagelets" for allocation of data. By subdividing the data pages, data for multiple DLLs may be stored in the same physical page rather than rounding every data segment allocation up to the next free page.

Exemplary Processor Description with Cache-locking Features

As discussed earlier, one embodiment of the present invention uses the RM7000 RISC processor, available from Quantum Effect Design, Inc. of Santa Clara, Calif. Those skilled in the art, having the benefit of this disclosure, will recognize that other processors with similar or better features may be used without departing from the scope of the present invention.

Figure 8:
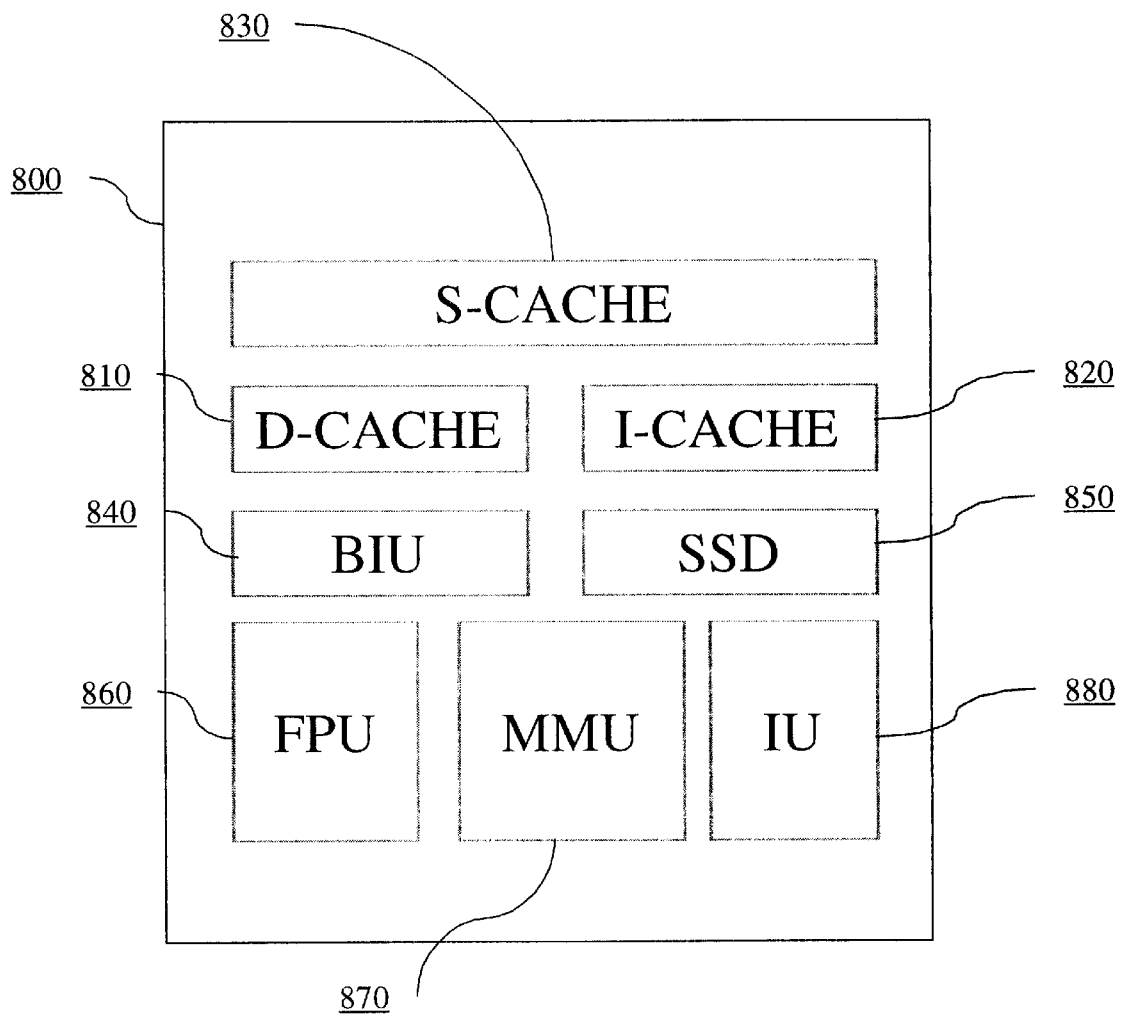
FIG. 8 is a simplified block diagram of the RM7000 processor used in one embodiment of the present invention.

FIG. 8 is a simplified block diagram of the RM7000 processor used in one embodiment of the present invention. As shown in FIG. 8, the RM 7000 processor 800 comprises a Primary Data Cache ("D-Cache") 810, a Primary Instruction Cache ("I-Cache") 820, a Secondary Cache ("S-Cache") 830, a Bus Interface Unit ("BIU") 840, a Superscalar Dispatch Unit ("SSD") 850, a Floating Point Unit ("FPU") 860, a Memory Management Unit ("MMU") 870, and an Integer Unit ("IU") 880. The RM7000 User Manual, available from Quantum Effect Design of Santa Clara, Calif., provides more detail regarding the RM7000 architecture, and should be consulted to obtain official documentation regarding this product.

As shown in FIG. 8, the RM7000 processor 800 contains three separate on-chip caches:

Primary Instruction Cache 820

This 16 Kbyte, 4-way set associative cache contains only instructions.

Primary Data Cache 810

This 16 Kbyte, 4-way set associative cache contains only data.

Secondary Cache 830

This 256 Kbyte, 4-way set associative cache contains both instructions and data.

Both the Primary Instruction Cache 820 and the Primary Data Cache 810 are 4-way set associative, with cache locking features that can be configured differently per set (in the RM7000 processor, only two of the four sets in each cache support cache locking). This higher set associativity, when compared to earlier processors, provides higher performance per bit of cache, greater performance stability across multiple compilations and greater granularity for the cache locking feature used according to aspects of the present invention.

One way to protect small but frequently reused instruction or data types, such as input, state, and tabular values, from being overwritten by other instructions or data is to lock the parts of the cache which contain the critical code or data. While locked, these cache lines are invisible to the cache replacement algorithm, and the contents will not be thrown out, only to be re-loaded when needed again.

Cache locking is accomplished in processors that support that feature by special machine instructions which execute the locking and unlocking functions. There are two basic variations on this technique. Static locking simply freezes the tag and contents of the affected line, allowing for the writing of values but not replacement. With static cache locking, the line is associated with the same portion of main memory until unlocked. Dynamic locking is somewhat more flexible, treating locked lines as an extension of the register set, with special instructions to copy contents directly to and from main memory.

As discussed above, the primary caches 810, 820 and secondary cache 830 of the RM7000 processor 800 used in embodiments of the present invention support cache locking. This mechanism allows the user to lock critical code or data segments in the cache on a per-line basis by setting the appropriate cache lock enable bits in the CP0 ECC register. However, in the RM7000 processor, only two of the four sets within each cache support cache locking.

In the RM7000 processor, the primary caches 810, 820 each require one cycle to access. Each primary cache has its own 64-bit read data path and 128-bit write data path, allowing both caches to be accessed simultaneously. The primary caches provide the integer and floating-point units with an aggregate bandwidth of over 5 Gbytes per second. The secondary cache 830 also has a 64-bit data path and is accessed only on a primary cache miss. The secondary cache 830 cannot be accessed in parallel with either of the primary caches 810, 820 and has a three-cycle miss penalty on a primary cache miss. During a primary instruction or data cache refill, the secondary cache 830 provides 64 bits of data every cycle following the initial 3-cycle latency. This results in a aggregate bandwidth of 2.5 Gbytes per second.

In addition to the three on-chip circuit caches 810, 820, 830, the RM7000 processor 800 provides a dedicated tertiary cache interface and supports off-chip tertiary cache sizes of 512 Kbytes, 2 Mbytes, and 8 Mbytes. The tertiary cache is only accessed after a secondary cache miss and hence cannot be accessed in parallel with the secondary cache 830. Both the secondary and tertiary caches can be disabled by setting the appropriate bits in the CP0 Config register. The secondary and tertiary caches are only capable of block writes and are never modified on a partial write. All of the RM7000 processor caches are virtually indexed and physically tagged, eliminating the potential for virtual aliasing.

The RM7000 processor 800 used in embodiments of the present invention implements a non-blocking architecture for each of the three on-chip caches 810, 820, 830. Non-blocking cache architecture improves overall performance by allowing the cache to continue operating even though a cache miss has occurred. In a typical blocking-cache implementation, the processor executes out of the cache until a miss occurs, at which time the processor stalls until the miss is resolved. The processor initiates a memory cycle, fetches the requested data, places it in the cache, and resumes execution. This operation can take many cycles, depending on the design of the memory system in each particular implementation. In contrast, in a non-blocking implementation, the caches do not stall on a miss. The processor continues to operate out of the primary caches 810, 820 until one of the following events occurs: (1) two cache misses are outstanding and a third load/store instruction appears on the instruction bus, or (2) a subsequent instruction requires data from either of the instructions that caused the cache misses.

The RM7000 processor 800 supports two outstanding cache misses for both the primary caches 810, 820 and secondary cache 830. When a primary cache miss occurs, the processor checks the secondary cache 830 to determine if the requested data is present. If the data is not present, a tertiary cache/main memory access is initiated. In this case, even though there was a primary and subsequent secondary cache miss, they are seen by the processor as one miss, since both accesses were for the same address location.

During this time, the processor continues executing out of the primary cache. If a second primary cache miss occurs, a second secondary cache access is generated. Even though two cache misses are outstanding, the processor continues to execute out of the primary cache. If a third primary cache miss occurs prior to the time either of the two aforementioned misses have been resolved, the processor stalls until either one is completed.

The non-blocking caches in the RM7000 processor 800 allow for more efficient use of techniques such as loop unrolling and software pipelining. To take maximum advantage of the caches, code should be scheduled to move loads as early as possible, away from instructions that may actually use the data.

To facilitate systems that have I/O devices which depend on in-order loads and stores, the default setting for the RM7000 processor 800 is to force uncached references to be blocking. These uncached references can be changed to non-blocking by using the uncached, non-blocking cache coherency attribute.

The RM7000 processor 800 supports cache locking of the primary caches 810, 820 and secondary cache 830 on a per-line basis. Cache locking allows critical code or data segments to be locked into the caches. In the primary data cache 810 and secondary cache 830, the locked contents can be updated on a store hit, but cannot be selected for replacement on a miss. Each of the three caches can be locked separately. However, in the RM7000 processor only two of the four sets of each cache support cache locking.

The RM7000 processor 800 allows a maximum of 128 Kbytes of data or code to be locked in the secondary cache, a maximum of 8 Kbytes of code to be locked in the instruction cache, and a maximum of 8 Kbytes of data to be locked in the data cache.

Primary cache locking is accomplished by setting the appropriate cache lock enable bits and specifying which set to lock in the ECC register, then bringing the desired data/code into the caches by using either a Load instruction for data, or a FILL_ICACHE CACHE operation for instructions while the cache lock enable bit is set. Locking in the secondary cache is accomplished by setting a separate secondary cache lock enable bit in the ECC register, then executing either a load instruction for data, or a FILL_ICACHE instruction for instructions while the secondary cache lock enable bit is set.

Table 7 below illustrates how the ECC register bits control cache locking and set selection in the RM7000 processor.

TABLE 7

Cache Locking Control

| Cache | Lock Enable | Set Select | How to Activate |
|---|---|---|---|
| Primary Instruction | ECC[27] | ECC[28]=0 -> A ECC[28]=1 -> B | CACHE Fill_I |
| Primary Data | ECC[26] | ECC[28]=0 -> A ECC[28]=1 -> B | Load/ Store |
| Secondary | ECC[25] | ECC[28]=0 -> A ECC[28]=1 -> B | CACHE Fill_I or Load/ Store |

Only sets A and B of a cache can be locked. ECC[28] determines the set to be locked, as shown in Table 7. Set A can be locked by clearing the ECC[28] bit and performing a load operation. Set B can then be locked by setting the ECC[28] bit and performing another load operation. This procedure allows both sets to be locked together. With the desired data and/or code in the caches, setting the lock enable bit inhibits cache updates. The lock enable bits should be cleared to allow future memory transactions to fill the caches normally.

In the RM7000 processor 800 shown in FIG. 8, a locked cache line can be unlocked by either clearing the lock bit in the tag RAM using the INDEX_STORE_TAG CACHE instruction, or by invalidating the cache line using one of the invalidate CACHE instructions. Invalidation of a cache line causes that line to be unlocked, even if the corresponding lock bit has not been cleared. Once the processor invalidates the line, it becomes a candidate for a fill operation. When the fill cycle occurs, the lock bit is cleared.

In the RM7000 processor 800 used in embodiments of the present invention, a bypass coherency attribute (known as "code 7") can be used to bypass the secondary and tertiary caches. However, this attribute can also be used to lock the contents of the secondary cache 830. The secondary cache 830 is first preloaded with data using one of the other coherency attributes. The bypass or uncached coherency attribute is then used for all subsequent instruction and data accesses to implicitly lock the secondary cache 830. Using this method causes the secondary cache 830 to behave as a read-only memory and ensures that data is never overwritten by a cache line fill or writeback.

Each of the three on-chip caches 810, 820, 830 in the RM7000 processor uses the same cyclic replacement algorithm. The algorithm attempts to perform a round-robin replacement for sets 0, 1, 2, and 3. Each of the four cache lines (one per set at a particular cache index) has a tag at the corresponding index in the tag RAM, and each tag RAM contains a corresponding fill (F) bit. The algorithm uses the state of the F bits to determine which set to replace.

Still referring to FIG. 8, in the RM7000 processor 800 used in embodiments of the present invention, the primary instruction cache 820 is 16 Kbytes in size and implements a 4-way set associative architecture. Line size is 32-bytes, or eight instructions. The 64-bit read path allows the RM7000 processor to fetch two instructions per clock cycle which are passed to the superscalar dispatch unit.

Figure 9:
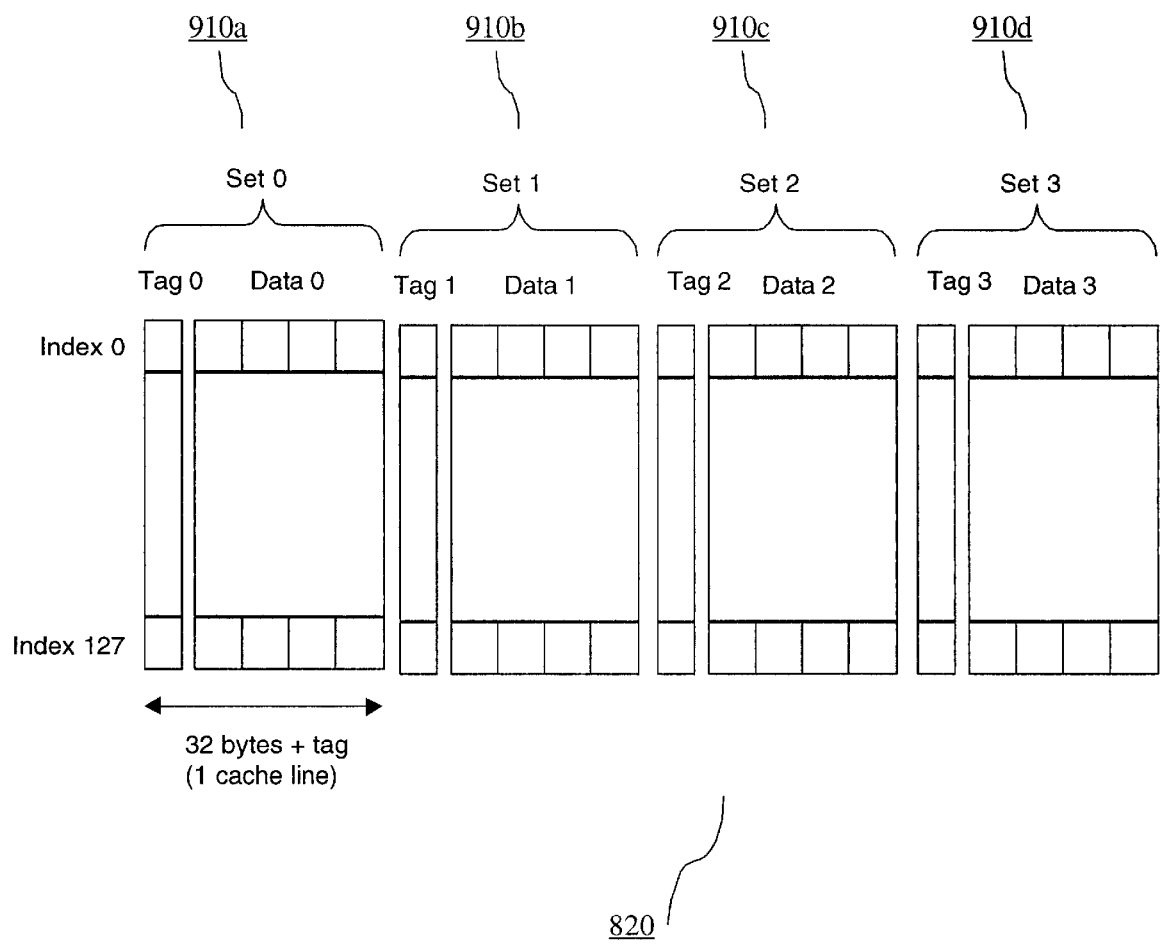
FIG. 9 is a block diagram of the primary instruction cache organization of the RM7000 processor used in one embodiment of the present invention.

Instruction cache 820 is organized as shown in FIG. 9. As discussed earlier, the instruction cache 820 is 4-way set associative and contains 128 indexed locations. As shown in FIG. 9, instruction cache 820 comprises four sets 910a–910d, each containing 128 indexed locations. Within each indexed location, there is one tag and 32 bytes of data. Each time the cache 820 is indexed, the tag and data portion of each set 910a–910d are accessed. Each of the four tag addresses are compared against the translated portion of the virtual address to determine which set 910a–910d contains the correct data.

Figure 10:
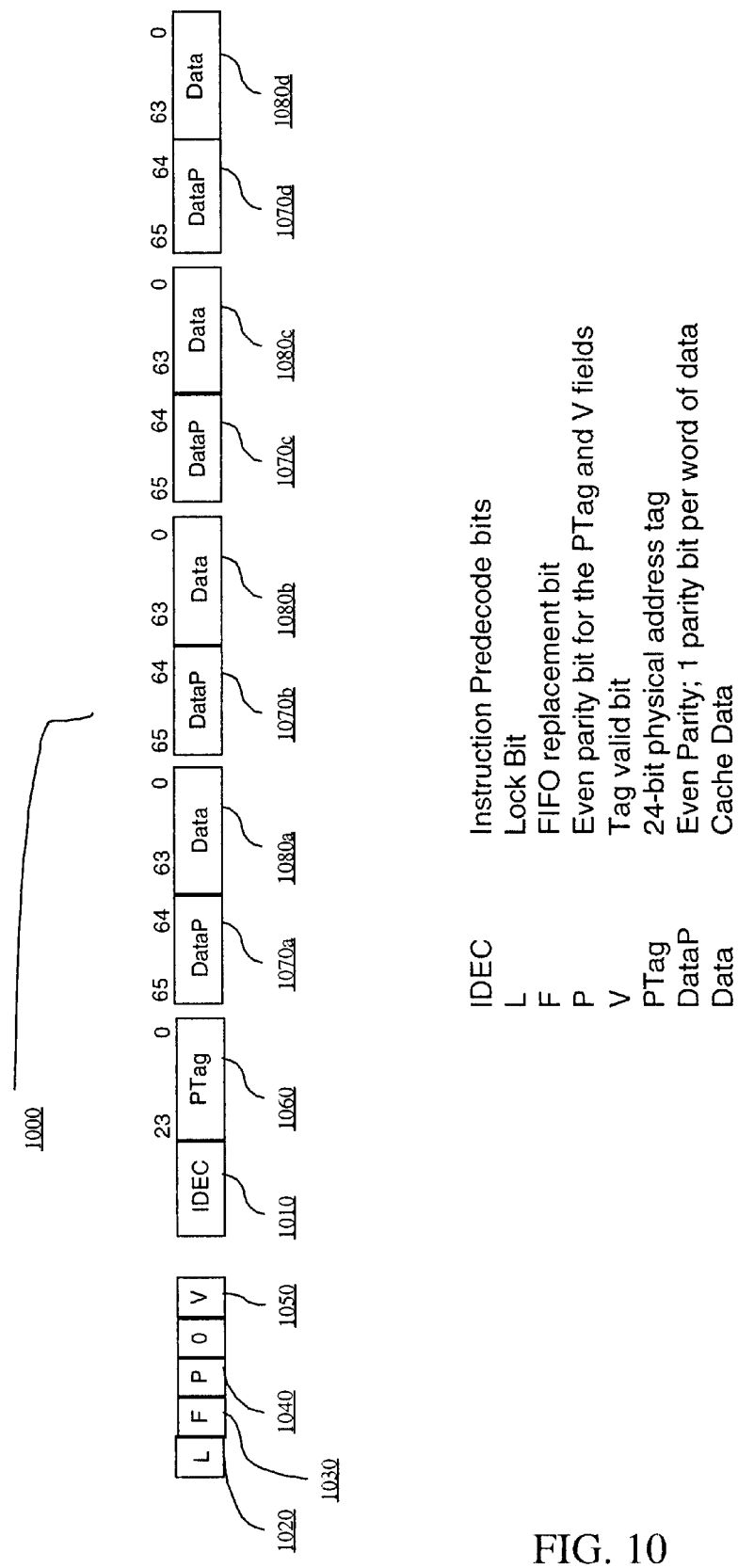
FIG. 10 is a block diagram of the primary instruction cache line format in the RM7000 processor used in one embodiment of the present invention.

When the instruction cache 820 is indexed, each of the four sets 910a–910d shown in FIG. 9 returns a single cache line. Each cache line consists of 32 bytes of data protected by a 2-bit word parity field, a 24-bit physical tag address, and three tag control bits. FIG. 10 shows the instruction cache line format. As shown in FIG. 10, each cache line 1000 contains Instruction Predecode bits ("IDEC") 1010, a Lock Bit 1020, a FIFO replacement bit 1030, an even parity bit 1040 for the PTag and V fields, a Tag valid bit 1050, a 24-bit physical address tag ("PTag") 1060 (bits 35:12 of the physical address), a data parity field 1070a–1070d for each word of data, and four 64-bit words of cache data 1080a–1080d.

Figure 11:
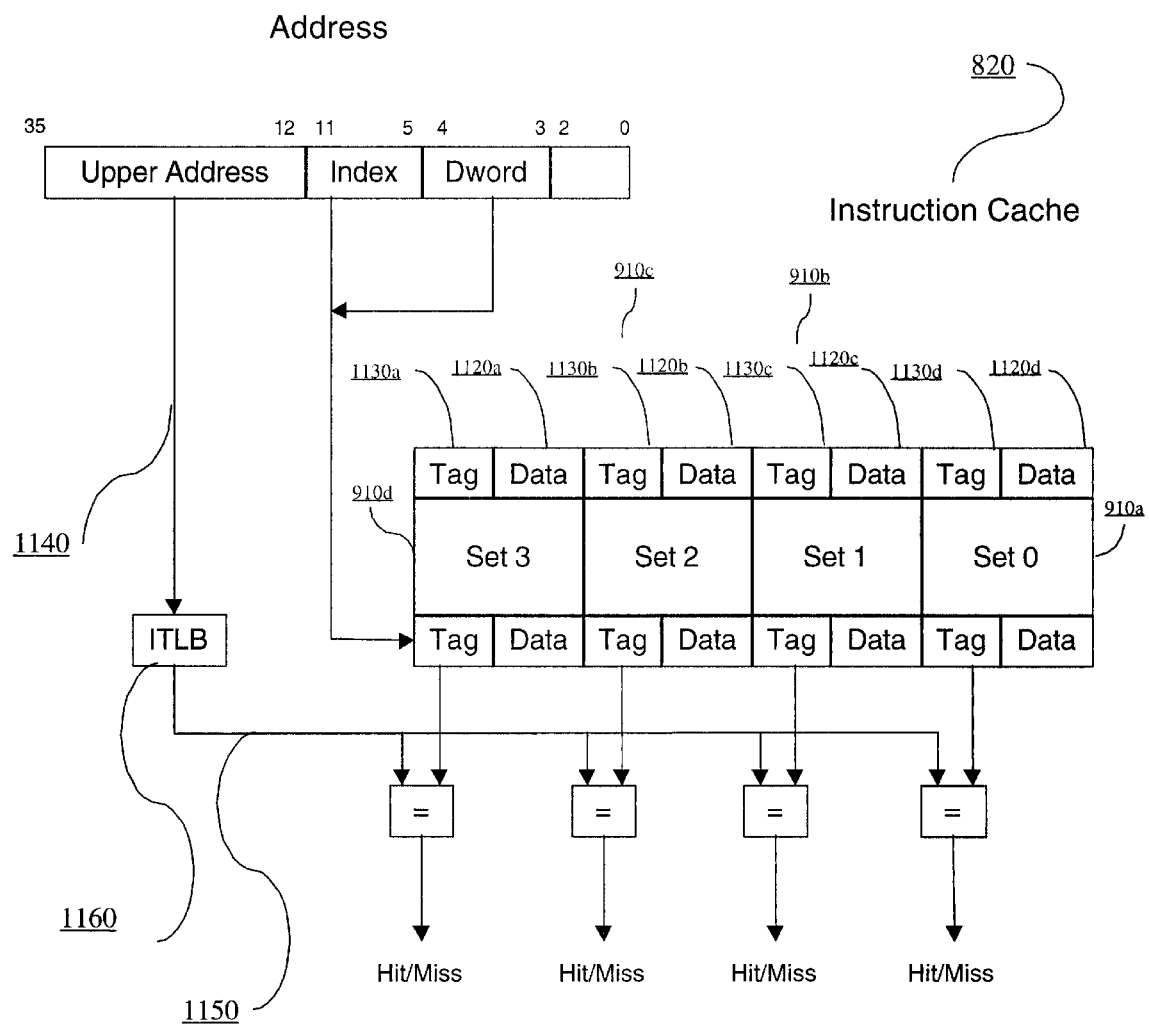
FIG. 11 is a block diagram illustrating how the virtual address is divided on an instruction cache access in the RM7000 processor used in one embodiment of the present invention.

Thus, the RM7000 processor implements a 4-way set associative instruction cache that is virtually indexed and physically tagged. Although the instruction cache is physically indexed, the access is performed in parallel with the virtual-to-physical address translation because only the upper bits of the address are translated. The lower bits are used directly for indexing the cache and do not go through translation. FIG. 11 illustrates how the virtual address is divided on an instruction cache access.

As shown in FIG. 11, the lower 12 bits of address are used for indexing the instruction cache 820. Bits 11 through 5 are used for indexing one of the 128 locations. Within each set 910a–910d there are four 64-bit doublewords of data. Bits 4:3 are used to index one of these four doublewords. The tag for each cache line 1110 is accessed using address bits 11:5.

When the cache 820 is indexed, the four blocks of data 1120a–1120d and corresponding physical address tags 1130a–1130d are fetched from the cache 820 at the same time that the upper address 1140 is being translated. The translated address 1150 from the instruction translation lookaside buffer ("ITLB") 1160 is then compared with each of the four address tags 1130a–1130d. If any of the four address tags 1130a–1130d yield a valid compare, the data from that set is used. This situation is called a "primary cache hit." If there is no match between the translated address 1150 and any of the four address tags 1130a–1130d, the cycle is aborted and a secondary cache access is initiated. This situation is called a "primary cache miss."

Locking a cache block prevents its contents from being overwritten by a subsequent cache miss. This mechanism allows a programmer to lock critical code into the cache and thereby guarantee deterministic behavior for a locked code sequence. In the RM7000 processor used in embodiments of the present invention, only valid cache lines can be locked. If a cache line within set 0 or 1 is invalid while either set is locked, that cache line can be changed by subsequent instruction fetches. The following code example can be used for locking the instruction cache in the RM7000 processor according to an embodiment of the present invention. When locking the instruction cache, the RM7000 processor should be executing code uncached, because executing code from the instruction cache while attempting to lock it may result in unpredictable behavior.

```
li      r1,LOCK_ICACHE | LOCK_SET0   #setup set 0 for locking
mtc0    r1,C0_ECC
nop
nop
cache   Fill_I,0(r10)                #lock this code
nop
nop
mtc0    r0,C0_ECC                    #next instr fetch not
                                     locked
```

Tagging and Loading Critical DLLs

Figure 12:
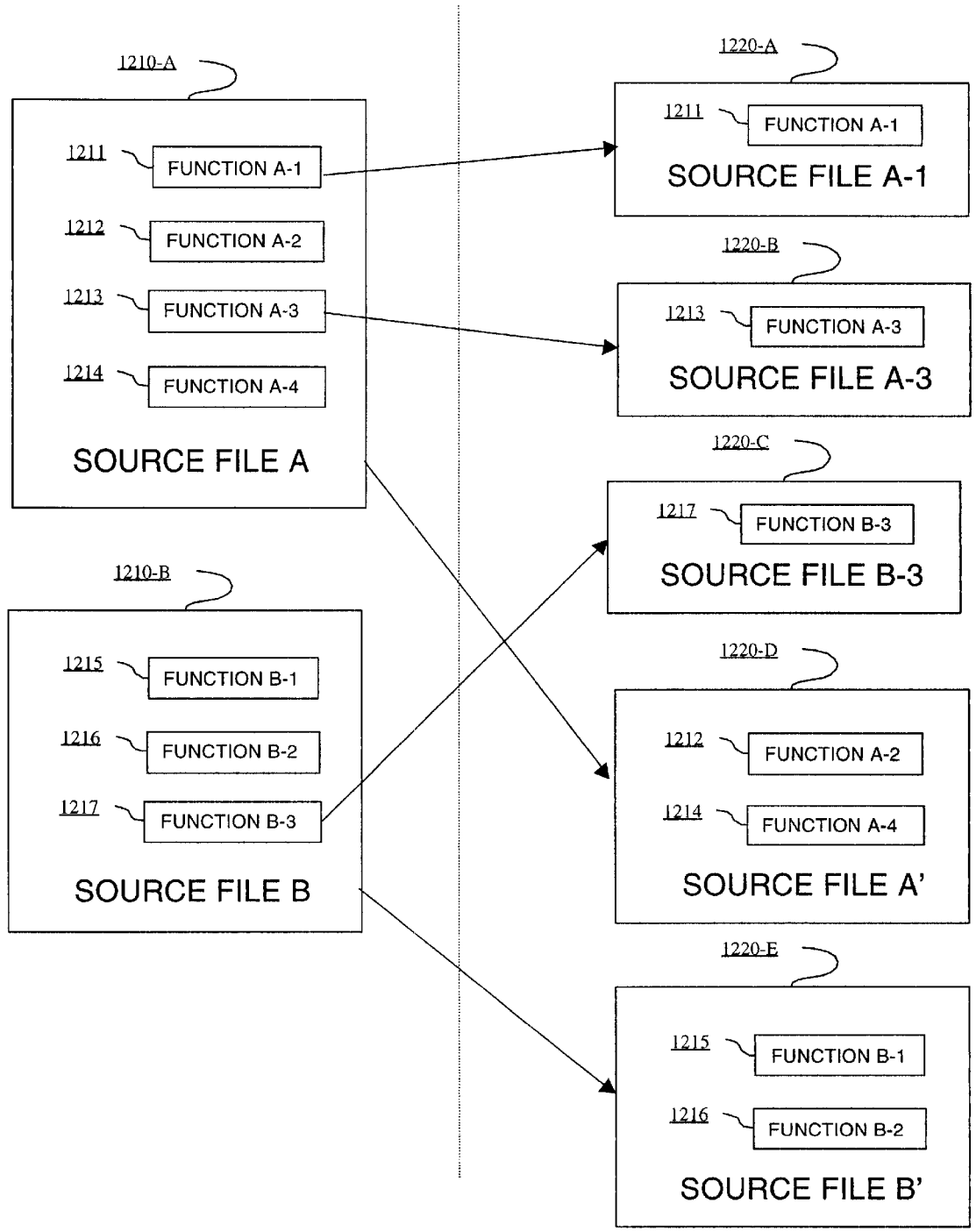
FIG. 12 is a simplified block diagram illustrating a set of source files containing a plurality of functions, wherein one or more of those functions are considered to be critical, and wherein the critical functions are separated from the rest of the functions according to aspects of the present invention.

According to aspects of the present invention, portions of critical code must be tagged, or identified, in some manner so that they may be recognized by a DLL loading program at run-time and loaded into the proper area of memory. For the sake of explanation, FIG. 12 illustrates an exemplary set of source files containing various functions, some of which are considered "critical." Along the left side of FIG. 12, a simplified set of source files comprising two source files 1210-A and 1210-B is shown. In any given implementation, the set of source files 1210 correspond to the set of source files from which DLLs will be generated. Those of ordinary skill in the art will recognize that in a typical practical implementation, there may be a large number (e.g., hundreds) of such source files 1210. As shown in FIG. 12, Source File A (1210-A) comprises four portions of code (also known as "functions," "routines," or subroutines): function A-1 (1211), function A-2 (1212), function A-3 (1213), and function A4 (1214). Source File B (1210-B) comprises three portions of code: function B-1 (1215), function B-2 (1216), and function B-3 (1217).

According to aspects of the present invention, the "critical" functions within each source file 1210 are identified. Depending on each particular implementation, the definition of "critical" functions will vary. In one embodiment relating to a data networking device such as a router, critical functions are those functions that most significantly affect the overall performance of the data networking device (e.g., packet forwarding functions). In one embodiment, critical functions are identified by monitoring the operation of the device (e.g., a router) to be optimized by using conventional test equipment such as logic analyzers. Using a logic analyzer, and knowing the address at which each function is stored in memory, the frequency with which each function is called, as well as the relative number of cache hits to cache misses and other similar information may be determined. Alternatively, the critical code functions may be identified by visual inspection of the source files and/or consultation with knowledgeable individuals familiar with the source files and with the particular implementation. Those of ordinary skill in the art will readily be able to conduct such experiments and inspections in accordance with the requirements of each particular implementation, and will recognize that many other suitable critical function identification techniques may be used within the scope of the present invention.

Regardless of the specific critical function identification method used, the critical functions are extracted from the source files in which they were originally contained, and stored in separate, individual, source files, with each such source file containing a single critical function. Referring back to FIG. 12, suppose that function A-1 (1211) and function A-3 (1213) in Source File A (1210-A) are identified as being critical, and that function B-3 (1217) in Source File B (1210-B) is identified as being critical. Naturally, each source file 1210 may contain any number of critical functions, ranging from zero to the full number of functions contained in the source file 1210.

Along the right side of FIG. 12, a new set of source files comprising five source files 1220-A–1220-E is shown. Source File A-1 (1220-A) comprises the critical function A-1 (1211). Source File A-3 (1220-B) comprises critical function A-3 (1213). Source file B-3 comprises critical function B-3 (1217). Source File A' (1220-D) comprises non-critical functions A-2 (1212) and A4 (1214). Finally, Source File B' (1220-E) comprises non-critical functions B-1 (1215) and B-2 (1216). Thus, in FIG. 12, the source files containing the individual critical functions are listed first, and the remaining source files (with any critical functions being extracted) are listed next. This order is solely for the sake of convenience in explaining these aspects of the present invention.

In conjunction with the process of identifying and separating the critical code functions as described above, a list of the critical functions is created, and associated with a "pre-load" file. The precise structure, storage location, and/or implementation of the pre-load file is not critical, so long as it contains a list of the critical functions (or equivalently, a list of the critical DLLs that will be generated from these critical functions, as will be described next).

Once the critical functions are identified and separated into individual "tiny" source files (in relative terms) as described above, and once the pre-load file has been created, all of the source files 1220 are compiled into DLLs, with each source file 1220 resulting in a single DLL. Exemplary mechanisms and command set parameters for performing this step were described earlier, and equivalent mechanisms and command set parameters are known to those of ordinary skill in the art.

In one embodiment, at run-time, a DLL Loader/DLL Manager (described earlier), explicitly reserves memory space for the DLLs corresponding to the critical functions (preferably in an area of memory that will be loaded onto an instruction cache that can be locked). The DLL Loader/DLL Manager parses the pre-load file described above, and loads the DLLs corresponding to the critical functions into the reserved memory area first (before the non-critical DLLs). Finally, cache locking is enabled, if available.

Figure 13:
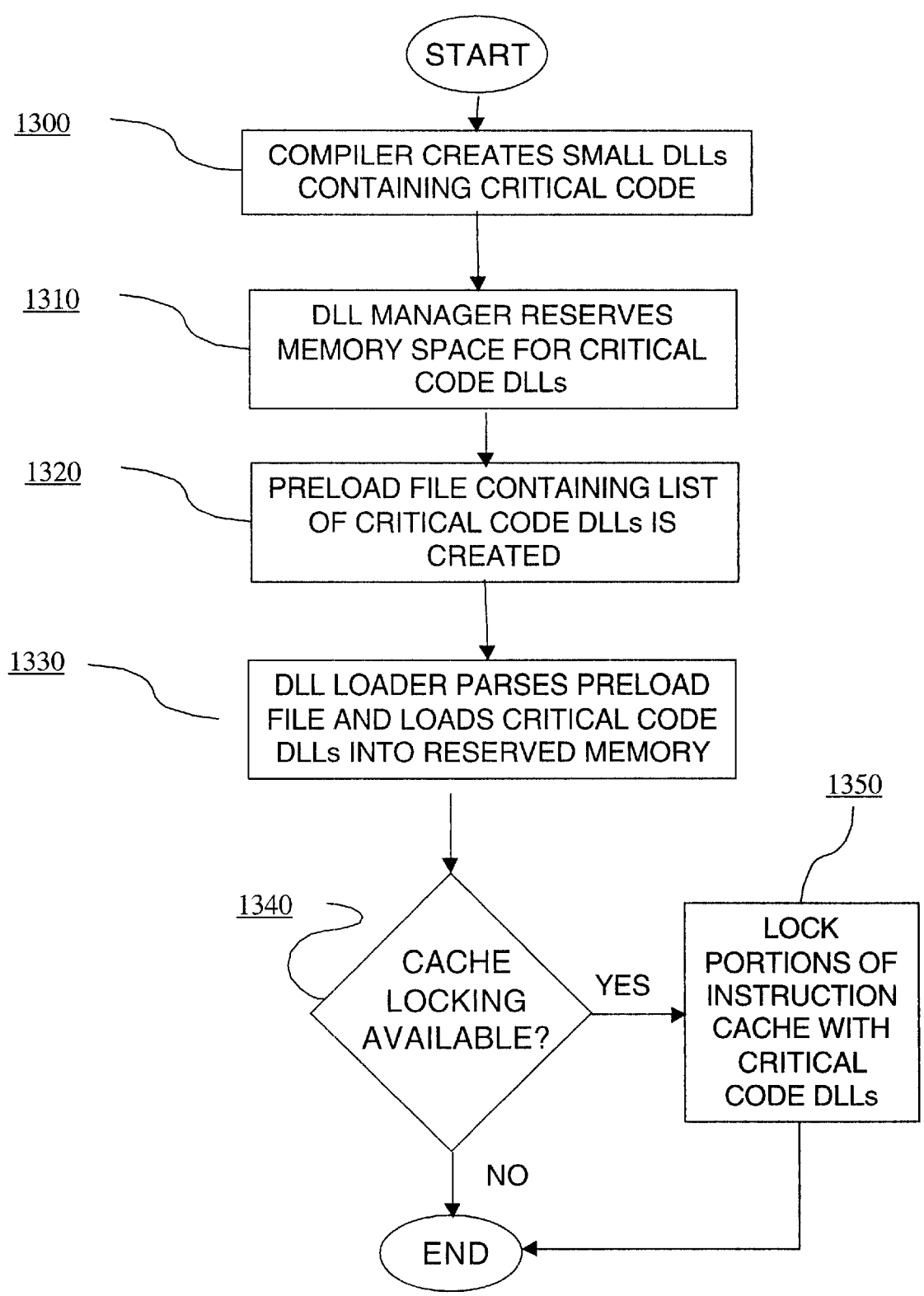
FIG. 13 is a flow chart illustrating the process of tagging and loading portions critical code according to one embodiment of the present invention.

FIG. 13 is a flow chart illustrating the process of tagging and loading portions critical code according to one embodiment of the present invention. The method shown in FIG. 13 is premised on modifying a standard DLL manager application so that it selectively loads DLLs on a 4-byte "pagelet" boundary instead of the typical 4K-byte page boundary. Such a modification is well within the capabilities of those of ordinary skill in the art, and is not discussed herein so as not to overcomplicate the present disclosure. Also, as is known to those of ordinary skill in the art, such a modification allows multiple small DLLs to reside on the same page in memory. Thus, as shown in FIG. 13, at step 1300, small DLLs are created for the portions of critical code to be optimized according to the present invention (as described above with reference to FIG. 12). In a typical network router application, such critical code may consist of the packet forwarding or switching algorithms. Next, at step 1310, the modified DLL manager reserves memory space for the DLLs created in step 1300. Then, at compile time (step 1320), a pre-load file is created (either manually or automatically) that contains a list of the DLLs containing the portions of critical code to be optimized.

At step 1330, which takes place during system initialization (i.e., at run-time), the modified DLL manager parses the pre-load file, identifies the small DLLs containing the portions of critical code to be optimized, and loads these DLLs into the memory space that had been reserved for that purpose at step 1310. At step 1340, a decision is made depending on whether the processor used in each particular application supports cache locking. If so, at step 1350, the areas of the instruction cache containing the DLLs with the potions of critical code to be optimized are locked. Exemplary techniques for locking the instruction cache on the RM7000 processor were described earlier. Those of ordinary skill in the art, having the benefit of this disclosure, will recognize that each processor will require a unique procedure to be executed in order to enable cache locking. This information is typically available from the vendors of each such commercially available processor. Regardless of whether the processor supports cache locking, the DLLs containing the portions of critical code to be optimized are loaded onto sequential cache lines. This step helps to prevent cache conflicts during the execution of the critical code. However, enabling cache locking in processors that support those features provides a significant performance improvement.

In general, the flowcharts in this specification include one or more steps performed by software routines executing in a computer system. The routines may be implemented by any means known in the art. For example, any number of computer programming languages, such as the Java™ language, C, C++, Pascal, Smalltalk, FORTRAN, assembly language, etc., may be used. Further, various programming approaches such as procedural, object oriented or artificial intelligence techniques may be employed. As known to those skilled in the art, the program code corresponding to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, or flash memory.

The block diagrams and flowcharts described herein are illustrative of merely the broad architectures and logical flow of steps to achieve a method of the present invention and steps may be added to, or taken away from, a flowchart without departing from the scope of the invention. Further, the order of execution of steps in the flowcharts may be changed without departing from the scope of the invention. Additional considerations in implementing the method described by a flowchart may dictate changes in the selection and order of steps.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for improving the performance of critical code execution, comprising:

extracting one or more critical functions from first source files;

creating a critical function source file for each critical function, each of the critical function source files including a corresponding critical function;

creating second source files, each of the second source files including remaining non-critical functions of a corresponding first source file;

generating a pre-load file including a list of the critical functions;

compiling the critical function source files and the second source files into a corresponding set of dynamic link libraries (DLLs) including critical DLLs and and non-critical DLLs; and loading the critical DLLs and the non-critical DLLs into a memory space at run-time.

2. The method according to claim 1, wherein the critical functions include a packet forwarding algorithm for use in internetworking devices.

3. The method according to claim 1, wherein in said loading the critical DLLs are loaded into the memory space prior to the non-critical DLLs.

4. The method according to claim 1, wherein said loading includes:

parsing the pre-load file to identify the critical DLLs from among the non-critical DLLs.

5. The method according to claim 1, further comprising:

reserving a specific memory space for the critical DLLs.

6. The method according to claim 5, further comprising:

enabling cache locking for the reserved memory space.

7. The method according to claim 6, wherein the critical functions include a packet forwarding algorithm for use in internetworking devices.

8. An apparatus for improving the performance of critical code execution, comprising:

means for extracting one or more critical functions from first source files;

means for creating a critical function source file for each critical function, each of the critical function source files including a corresponding critical function;

means for creating second source files, each of the second source files including remaining non-critical functions of a corresponding first source file;

means for generating a pre-load file including a list of the critical functions;

means for compiling the critical function source files and the second source files into a corresponding set of dynamic link libraries (DLLs) including critical DLLs and non-critical DLLs; and means for loading the critical DLLs and the non-critical DLLs into a memory space at run-time.

9. The apparatus according to claim 8, wherein the critical functions include a packet forwarding algorithm for use in internetworking devices.

10. The apparatus according to claim 8 wherein said means for loading loads the critical DLLs into the memory space prior to the non-critical DLLs.

11. The apparatus according to claim 8, wherein said means for loading includes:

means for parsing the pre-load file to identify the critical DLLs from among the non-critical DLLs.

12. The apparatus according to claim 8, further comprising:

means for reserving a specific memory space for the critical DLLs.

13. The apparatus according to claim 12, further comprising:

means for enabling cache locking for the reserved memory space.

14. The apparatus according to claim 13, wherein the critical functions include a packet forwarding algorithm for use in internetworking devices.

15. A program storage device readable by a machine, tangibly embodying a program of instructions executable by the machine to perform a method for improving the performance of critical code execution, the method comprising:

extracting one or more critical functions from first source files;

creating a critical function source file for each critical function, each of the critical function source files including a corresponding critical function;

creating second source files, each of the second source files including remaining non-critical functions of a corresponding first source file;

generating a pre-load file including a list of the critical functions;

compiling the critical function source files and the second source files into a corresponding set of dynamic link libraries (DLLs) including critical DLLs and non-critical DLLs; and loading the critical DLLs and the non-critical DLLs into a memory space at run-time.

16. An apparatus, comprising:

a microprocessor, said microprocessor including an instruction cache;

a memory containing a set of dynamic link libraries (DLLs), said DLLs including critical DLLs and non-critical DLLs, each of the critical DLLs including only one critical function, each of the non-critical DLLs including one or more non-critical functions;

a pre-load file comprising a list of the critical DLLs;

a utility for parsing said pre-load file at run-time so as to identify the critical DLLs from among the DLLs; and a DLL loader cooperative with said utility, for loading the critical DLLs and the non-critical DLLs onto the instruction cache, the critical DLLs being loaded into a specific memory area of the instruction cache reserved for the critical DLLs.

17. The apparatus of claim 16, wherein said apparatus is a data networking device.

18. The apparatus according to claim 17, further comprising logic for enabling cache locking for at least a portion of the instruction cache.

19. The apparatus according to claim 16, further comprising:

logic for enabling cache locking for at least a portion of the instruction cache.

20. The apparatus according to claim 16, wherein the critical DLLs include a packet forwarding algorithm for use in internetworking devices.

21. The apparatus according to claim 20, further comprising logic for enabling cache locking for at least a portion of the instruction cache.

22. An apparatus for improving the performance of critical code execution, comprising:

a critical function extractor for extracting one or more critical functions from first source files;

a source file generator for creating a critical function source file for each critical function, each of the critical function source files including a corresponding critical function, and for creating second source files, each of the second source files including remaining non-critical functions of a corresponding first source file;

a pre-load file generator for generating a pre-load file including a list of the critical functions;

a compiler for compiling the critical function source files and the second source files into a corresponding set of dynamic link libraries (DLLs) including critical DLLs and non-critical DLLs; and a DLL loader for loading the critical DLLs and the non-critical DLLs into a memory space at run-time.

23. The apparatus according to claim 22, wherein said DLL loader loads the critical DLLs into the memory space prior to the non-critical DLLs.

24. The apparatus according to claim 22, further comprising:

a run-time parsing utility for parsing the pre-load file at run-time to identify the critical DLLs from among the non-critical DLLs.

25. The apparatus according to claim 22, further comprising:

a memory allocator for reserving a specific memory space for the critical DLLs.

26. The apparatus according to claim 25, further comprising:

logic for enabling cache locking for the reserved memory space.

27. The apparatus according to claim 26, wherein said critical code includes a packet forwarding algorithm for use in internetworking devices.

28. The apparatus according to claim 22, wherein said critical code includes a packet forwarding algorithm for use in internetworking devices.

* * * * *